(12) United States Patent
Lee

(10) Patent No.: US 11,659,295 B2
(45) Date of Patent: *May 23, 2023

(54) IMAGE SENSOR

(71) Applicant: SAMSUNG ELECTRONICS CO., LTD., Suwon-si (KR)

(72) Inventor: Hyeokjong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,877

(22) Filed: Nov. 22, 2021

(65) Prior Publication Data

US 2022/0086376 A1 Mar. 17, 2022

Related U.S. Application Data

(63) Continuation of application No. 16/743,098, filed on Jan. 15, 2020, now Pat. No. 11,212,472.

(30) Foreign Application Priority Data

May 20, 2019 (KR) .................. 10-2019-0058751

(51) Int. Cl.
*H04N 25/70* (2023.01)
*H04N 25/76* (2023.01)
*H04N 25/68* (2023.01)
*H04N 25/75* (2023.01)

(52) U.S. Cl.
CPC ............ *H04N 25/70* (2023.01); *H04N 25/68* (2023.01); *H04N 25/75* (2023.01); *H04N 25/76* (2023.01)

(58) Field of Classification Search
CPC ........ H04N 5/369; H04N 5/367; H04N 5/374; H04N 5/378; H04N 5/379; H04N 25/70; H04N 25/68; H04N 25/75; H04N 25/76; H04N 25/79
See application file for complete search history.

(56) References Cited

U.S. PATENT DOCUMENTS

| 6,298,459 | B1 | 10/2001 | Tsukamoto | |
|---|---|---|---|---|
| 7,872,645 | B2 | 1/2011 | Myers | |
| 8,054,354 | B2 * | 11/2011 | Taura | H04N 25/00 348/294 |
| 9,380,240 | B2 | 6/2016 | Yamaoka | |

(Continued)

FOREIGN PATENT DOCUMENTS

JP 2009-213012 9/2009

*Primary Examiner* — Nelson D. Hernández Hernández
(74) *Attorney, Agent, or Firm* — F. Chau & Associates, LLC

(57) ABSTRACT

An image sensor including: a plurality of phase shift code generators, wherein each of the plurality of phase shift code generators outputs a phase shift code; a. test data selection circuit for outputting test data corresponding to a test pattern; a counter for receiving the phase shift code from at least one of the plurality of phase shift code generators, receiving the test data from the test data selection circuit, latching a digital code corresponding to the test pattern using the phase shift code, and outputting the digital code; and a control logic for calculating a data pattern using the digital code and selecting one of the plurality of phase shift code generators in accordance with a result of a comparison between the data pattern and the test pattern.

20 Claims, 13 Drawing Sheets

(56) References Cited

U.S. PATENT DOCUMENTS

| | | |
|---|---|---|
| 9,438,837 B2 | 9/2016 | Ono |
| 11,212,472 B2 * | 12/2021 | Lee .................. H04N 5/378 |
| 2009/0026352 A1 * | 1/2009 | Shimomura ........... H04N 25/75 |
| | | 250/214 R |
| 2010/0110252 A1 * | 5/2010 | Shimomura ........... H04N 5/378 |
| | | 348/E5.091 |
| 2010/0182473 A1 | 7/2010 | Nakamura |
| 2015/0237277 A1 | 8/2015 | Honda et al. |
| 2018/0035108 A1 * | 2/2018 | Chae .................. H04N 17/002 |
| 2020/0374474 A1 | 11/2020 | Lee |

* cited by examiner

IMAGE SENSOR

CROSS-REFERENCE TO RELATED APPLICATIONS

This application is a continuation of U.S. patent application Ser. No. 16/743,098 filed on Jan. 15, 2020, which claims priority under 35 U.S.C. § 119 to Korean Patent Application No. 10-2019-0058751 filed on May 20, 2019 in the Korean Intellectual Property Office, the disclosures of which are incorporated by reference herein in their entireties.

TECHNICAL FIELD

Exemplary embodiments of the present inventive concept relate to an image sensor.

DISCUSSION OF RELATED ART

An image sensor is a semiconductor-based sensor for receiving Light and an generating electrical signal. For example, an image sensor converts light into an electrical signal that conveys information used to make an image. An image sensor may include a pixel array including a plurality of pixels, a logic circuit for driving the pixel array and generating an image, and the like. The plurality of pixels may include a photodiode for generating an electric charge by reacting to external light, a pixel circuit for converting the electric charge generated by the photodiode into an electrical signal, and the like. An image sensor was traditionally employed in cameras for capturing still and video image, but is now widely applied to smartphones, tablet personal computers (PCs), laptop computers, televisions, vehicles, and the like. Recently, a variety of methods for improving a process yield of an image sensor have been developed.

SUMMARY

According to an exemplary embodiment of the present inventive concept, an image sensor is provided, the image sensor including a plurality of phase shift code generators, wherein each of the plurality of phase shift code generators outputs a phase shift code; a test data selection circuit for outputting test data corresponding to a test pattern; a counter for receiving the phase shift code from at least one of the plurality of phase shift code generators, receiving the test data from the test data selection circuit, latching a digital code corresponding to the test pattern using the phase shift code, and outputting the digital code; and a control logic for calculating a data pattern using the digital code and selecting one of the plurality of phase shift code generators in accordance with a result of a comparison between the data pattern and the test pattern.

According to an exemplary embodiment of the present inventive concept, an image sensor is provided, the image sensor including a pixel array including a plurality of pixels connected to a plurality of row lines and a plurality of column lines; a sampling circuit including a plurality of comparators for sampling a pixel signal output to one of the plurality of column lines and a ramp signal generated by a ramp voltage generator; a test data generator for outputting test data corresponding to a test pattern; a test data selection circuit for selecting and outputting one of an output of the comparator and the test data; a plurality of phase shift code generators, wherein each of the plurality of phase shift code generators outputs a phase shift code; a counter for receiving the phase shift code from at least one of the plurality of phase shift code generators, latching a digital code corresponding to the test pattern using the phase shift code, and outputting the latched digital code; and a control logic for comparing the digital code with the test pattern and selecting one of the plurality of phase shift code generators in accordance with a result of a comparison.

According to art exemplary embodiment of the present inventive concept, an image sensor is provided, the image sensor including a first phase shift code generator for outputting a first phase shift code; a second phase shift code generator for outputting a second phase shift code; a control logic for identifying an operational mode of the image sensor, receiving a first test result signal in a test mode, and comparing a test pattern with the first test result signal; a test data generator for receiving the test pattern from the control logic and outputting test data corresponding to the test pattern; and a counter for receiving the first phase shift code and the test data, and outputting a digital code corresponding to the test data as the first test result signal using the first phase shift code, wherein the control logic stores a result of a comparison between the test pattern and the first test result signal in a memory as selection information.

BRIEF DESCRIPTION OF DRAWINGS

The above and other features of the present inventive concept will be more clearly understood by describing in detail exemplary embodiments thereof in conjunction with the accompanying drawings, in which.

DETAILED DESCRIPTION OF THE EMBODIMENTS

Figure 1:
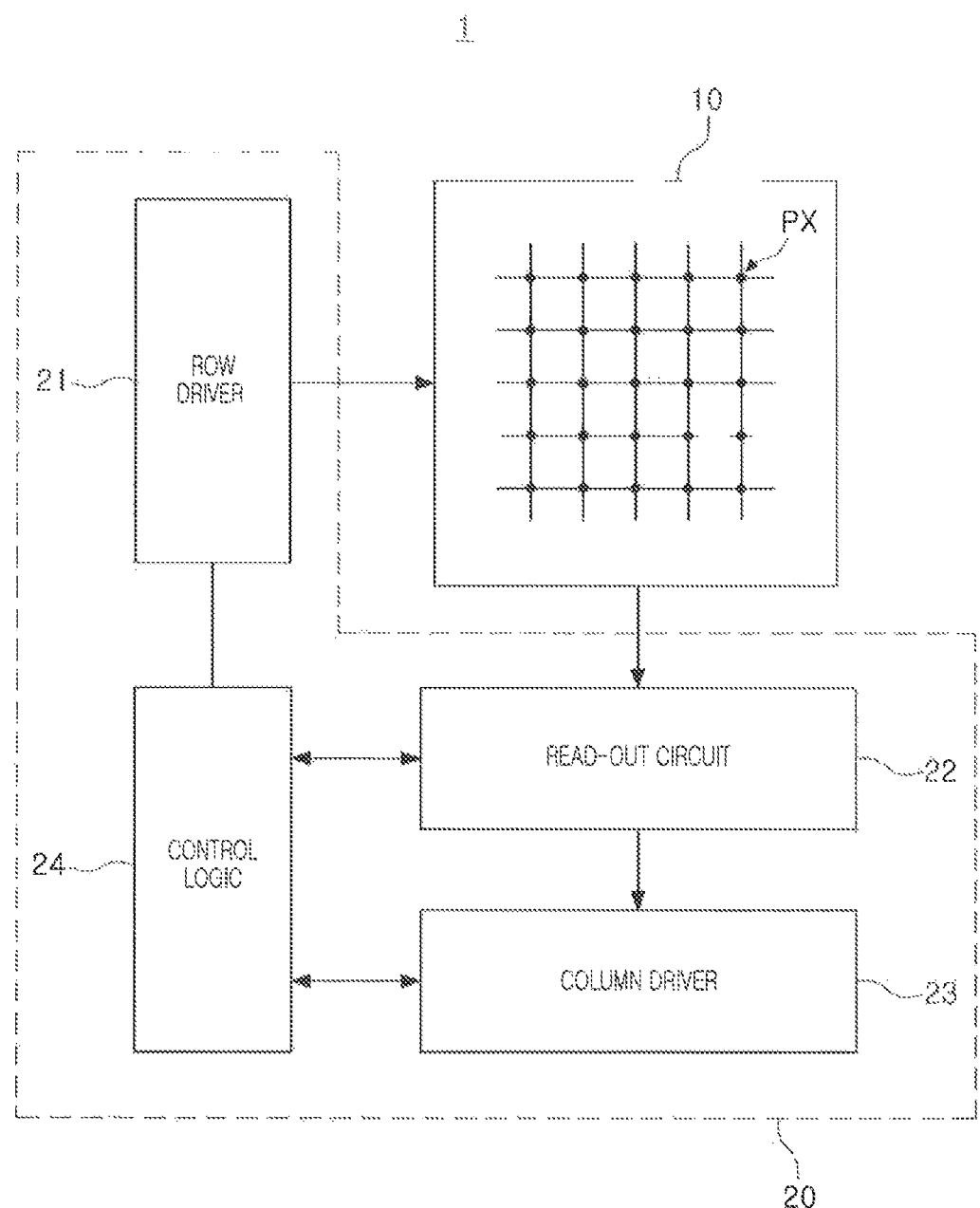
FIG. 1 is a diagram illustrating an image sensor according to an exemplary embodiment of the present inventive concept.

Hereinafter, exemplary embodiments of the present inventive concept will be described with reference to the accompanying drawings. Like reference numerals may refer to like elements in the drawings.

FIG. 1 is a diagram illustrating an image sensor according to an exemplary embodiment of the present inventive concept.

Referring to FIG. 1, an image sensor 1 in the present embodiment may include a pixel array 10 and a controller 20, and the controller 20 may include a row driver 21, a read-out circuit 22, a column driver 23, a control logic 24, and the like.

The image sensor 1 may convert light received from the outside into an electrical signal and may generate image data. The pixel array 10 included in the image sensor 1 may include a plurality of pixels PX, and the plurality of pixels PX may include a photoelectric device for receiving light and generating an electric charge. The photoelectric device ma be a photodiode, for example. In an exemplary embodiment of the present inventive concept, each of the plurality of pixels PX may include two or more photoelectric devices. Each of the plurality of pixels PX may include two or more photoelectric devices to generate pixel signals corresponding to a variety of colors of light or to provide an autofocusing function.

Each of the plurality of pixels PX may include a pixel circuit for generating a pixel signal from electric charges generated by photodiodes. As an example, the pixel circuit may include a transfer transistor, a driving transistor, a select transistor, a reset transistor, and the like. A pixel circuit of each of the plurality of pixels PX may output a reset voltage and a pixel voltage. A pixel voltage may be a voltage in which electric charges generated by the photodiodes included in each of the plurality of pixels PX are reflected. In an exemplary embodiment of the present inventive concept, two or more adjacent pixels PX may form a single pixel group, and two or more pixels PX included in a pixel group may share at least portions of the transfer transistor, the driving transistor, the select transistor, and the reset transistor.

The row driver 21 may drive the pixel array 10 in a row unit. For example, the row driver 21 may generate a transfer control signal for controlling the transfer transistor of the pixel circuit, a reset control signal for controlling the reset transistor of the pixel circuit, a selection control signal for controlling the select transistor of the pixel circuit, and the like.

The read-out circuit 22 may include a sampling circuit, a counter circuit, and the like. The sampling circuit may include a plurality of comparators, and in an exemplary embodiment of the present inventive concept, the comparator may be a correlated double sampler (CDS). The comparator may be connected to pixels PX included in a row line selected by the row driver 21 through column lines, and may detect a reset voltage and a pixel voltage from the respective pixels PX. The comparators may compare each of a reset voltage and a pixel voltage with a ramp voltage, and may output a result of the comparison. The counter circuit may include a phase shift code generator and counters, and each of the counters may include a plurality of latches. The counter circuit may convert a result of the comparison output from the comparators into a digital signal and may output the digital signal.

The column driver 23 may include a latch or a buffer circuit for temporarily storing a digital signal, an amplifier circuit, and the like, and may process a digital signal received from the read-out circuit 22. The row driver 21, the read-out circuit 22, and the column driver 23 may be controlled by the control logic 24. The control logic 24 may include a timing controller for controlling operation timings of the row driver 21, the read-out circuit 22, and the column driver 23, an image signal processor for processing image data, and the like.

The phase shift code generator of the counter circuit may not operate normally due to a process variation. In the present embodiment, the image sensor 1 may test whether the phase shift code generator operates normally. The image sensor 1 may perform a repair operation when a defect is detected in a test operation. For example, the image sensor 1 may replace a defective phase shift code generator with a spare phase shift code generator. The image sensor 1 may secure an additional operation margin of the phase shift code generator, thereby improving a manufacturing yield.

Figure 2:
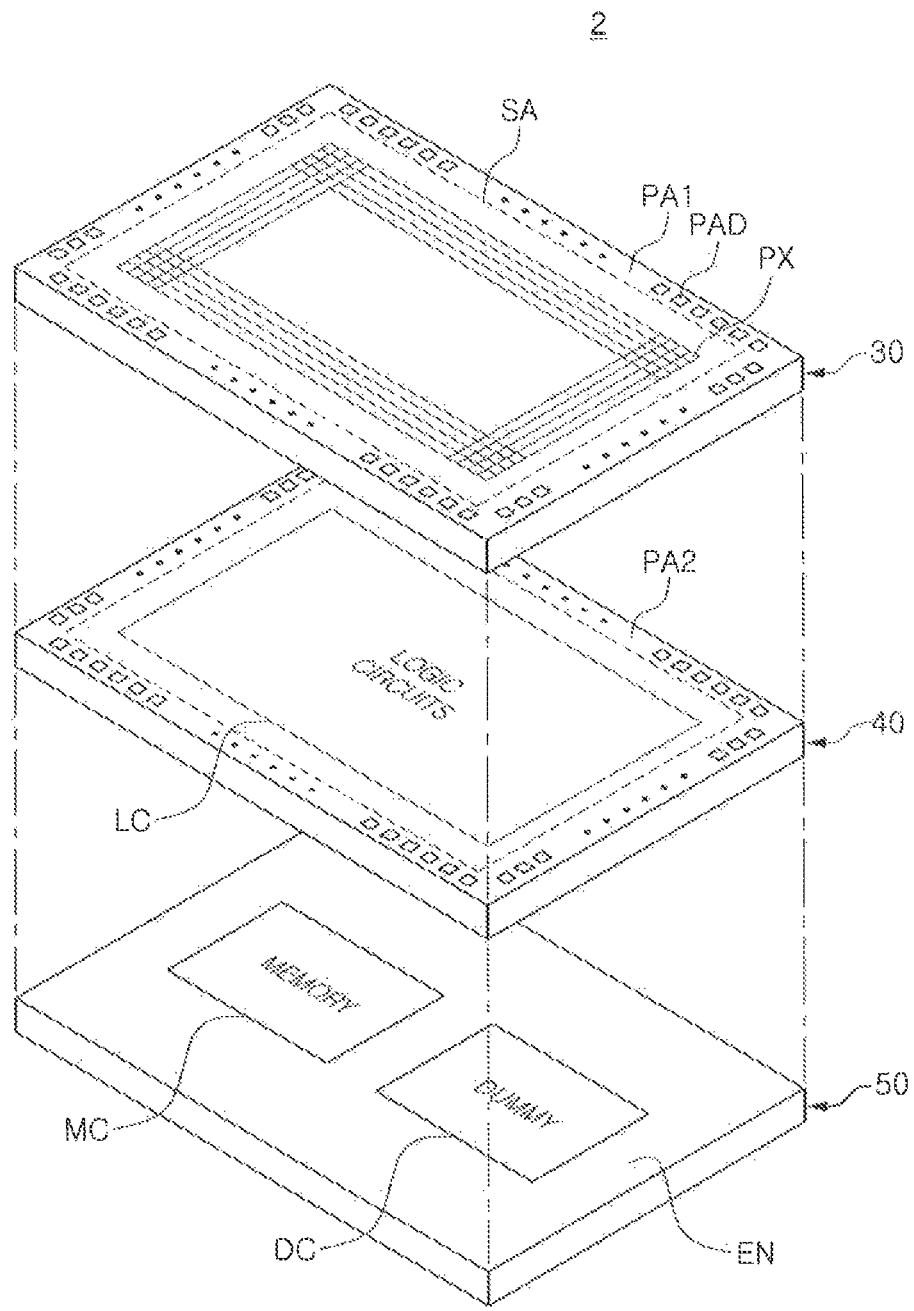
FIGS. 2 and 3 are diagrams illustrating an imaging device including an image sensor according to an exemplary embodiment of the present inventive concept.
Figure 3:
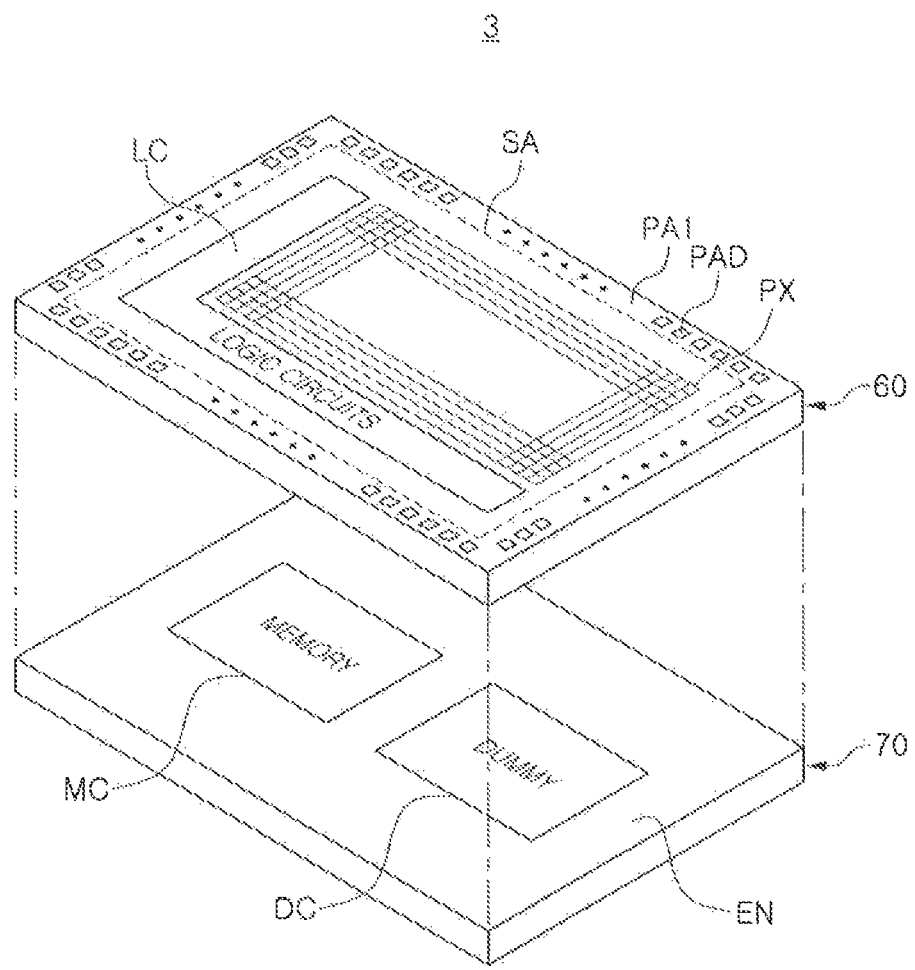

FIGS. 2 and 3 are diagrams illustrating an imaging device including an image sensor according to an exemplary embodiment of the present inventive concept.

Referring to FIG. 2, an imaging device 2 in the present embodiment may include a first layer 30, a second layer 40 arranged at a lower portion of the first layer 30, a third layer 50 arranged at a lower portion of the second layer 40, and the like. The first layer 30, the second layer 40, and the third layer 50 may be stacked in a vertical direction. In an exemplary embodiment of the present inventive concept, the first layer 30 and the second layer 40 may be stacked on a wafer level, and the third layer 50 may be attached to a lower portion of the second layer 40. The first to third layers 30, 40, and 50 may be provided in a single semiconductor package.

The first layer 30 may include a sensing region SA in which a plurality of pixels PX are arranged, and a first pad region PA1 arranged around the sensing region SA. A plurality of upper pads PAD may be included in the first pad region PA1, and the plurality of upper pads PAD may be connected to pads arranged in a second pad region PA2 of the second layer 40 and a control logic LC through a via, or the like.

Each of the plurality of pixels PX may include a photodiode for receiving light and generating an electric charge, a pixel circuit for processing the electric charge generated by the photodiode, and the like. The pixel circuit may include a plurality of transistors for outputting a voltage corresponding to an electric charge generated by the photodiode.

The second layer 40 may include a plurality of devices constituting the control logic LC. The plurality of devices included in the control logic LC may be circuits for driving a pixel circuit arranged on the first layer 30, a row driver, a column driver, and a timing controller, and the like, for example. The plurality of devices included in the control logic LC may be connected to die pixel circuit through the first and second pad regions PA1 and. PA2. The control logic. LC may obtain a reset voltage and a pixel voltage from the plurality of pixels PX and may generate a pixel signal.

In an exemplary embodiment of the present inventive concept, at least one of the plurality of pixels PX may include a plurality of photodiodes disposed at the same level. Pixel signals generated by an electric charge of each of the plurality of photodiodes may have a phase difference therebetween. Accordingly, the control logic LC may provide an autofocusing function based on phase differences of the pixel signals generated by the plurality of photodiodes included in a single pixel PX.

The third layer 50 arranged at a lower portion of the second layer 40 may include a memory chip MC, a dummy chip DC, and a protective layer EN for sealing the memory chip MC and the dummy chip DC. The memory chip MC may be a dynamic random access memory (DRAM) or a static random access memory (SRAM), and the dummy chip DC may not be used to store data. The memory chip MC may be electrically connected to at least portions of devices included in the control logic LC of the second layer 40 by a bump, and may store information used to provide an autofocusing function. in an exemplary embodiment of the present inventive concept, the bump may be a microbump.

Referring to FIG. 3, an imaging device 3 in the present embodiment may include a first layer 60 and a second layer 70. The first layer 60 may include a sensing region SA in which a plurality of pixels PX are arranged, a control logic region LC in which devices for driving the plurality of pixels PX are arranged, and a first pad region PA1 arranged around the sensing region SA and the control logic region LC. The first pad region PA1 may include a plurality of upper pads PAD, and the plurality of upper pads PAD may be connected to a memory chip MC arranged on the second layer 70 through a via, or the like. The second layer 70 may include a memory chip MC, a dummy chip DC, and a protective layer EN for sealing the memory chip MC and the dummy chip DC.

Figure 4:
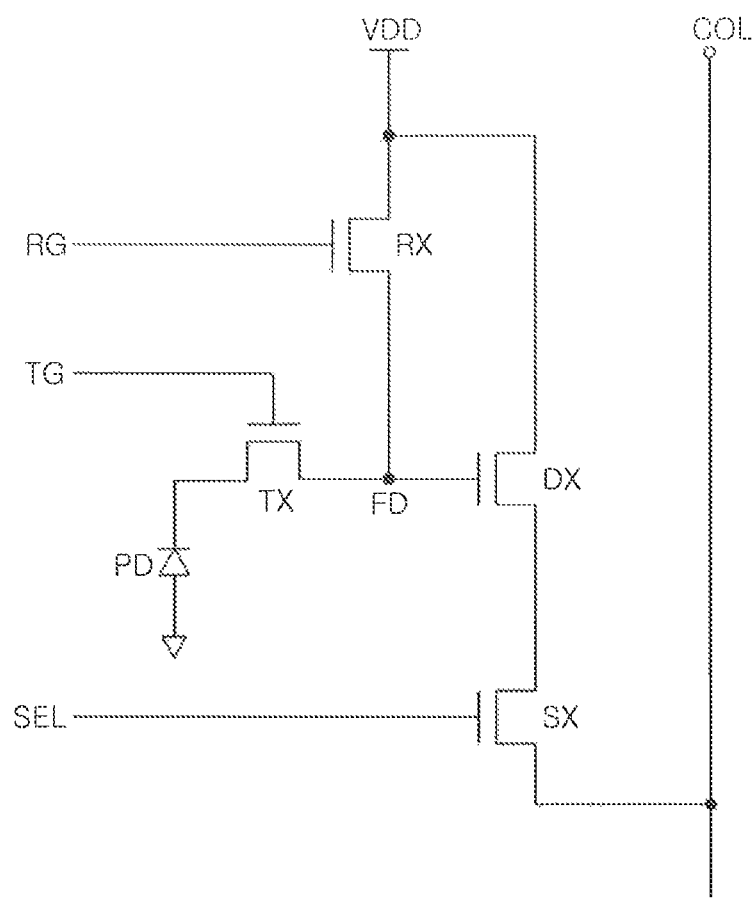
FIG. 4 is a circuit diagram illustrating pixels included in an image sensor according to an exemplary embodiment of the present inventive concept.

FIG. 4 is a circuit diagram illustrating pixels included in an image sensor according to an exemplary embodiment of the present inventive concept.

Referring to FIG. 4, a pixel included an image sensor may include a photodiode PD for generating an electric charge by reacting to light, a pixel circuit for processing an electric change generated by the photodiode PD and outputting an electrical signal, and the like. As an example, the pixel circuit may include a reset transistor RX, a driving transistor DX, a select transistor SX, a transfer transistor TX, and the like.

The reset transistor RX may be turned on and turned off by a reset control signal RG. When the reset transistor RX is turned on, a voltage of a floating diffusion FD may be reset to a power voltage VDD. When the floating diffusion FD is reset, the select transistor SX may be turned on by a selection control signal SEL, and a reset voltage may be output to a column line COL.

In an exemplary embodiment of the present inventive concept, the photodiode PD may generate electrons or holes as a main charge carrier by reacting to light. When the transfer transistor TX is turned on after a reset voltage is output to the column line COL, an electric charge generated by the photodiode PD being exposed light may move to the floating diffusion FD. The transfer transistor TX may be turned on b a transfer control signal TG. The driving transistor DX may operate as a source-follower amplifier which amplifies a voltage of the floating diffusion FD, and when the select transistor SX is turned on by the selection control signal SEL, a pixel voltage corresponding to the electric. change generated by the photodiode PD may be output to the column line COL.

Each of a reset voltage and a pixel voltage may be detected by a sampling circuit connected to the column line COL. The sampling circuit may include a plurality of comparators each having a first input terminal and a second input terminal. A ramp voltage may be input to the first input terminal of the comparator, and a reset voltage and a pixel voltage may be input to the second input terminal of the comparator. A counter may be connected to an output terminal of the comparator, and the counter may output reset data corresponding to a result of a comparison between a ramp voltage and a reset voltage, and pixel data corresponding to the result of the comparison between the ramp voltage and the pixel voltage. A control logic may generate image data of a pixel PX using a difference between the reset data and the pixel data.

Figure 5:
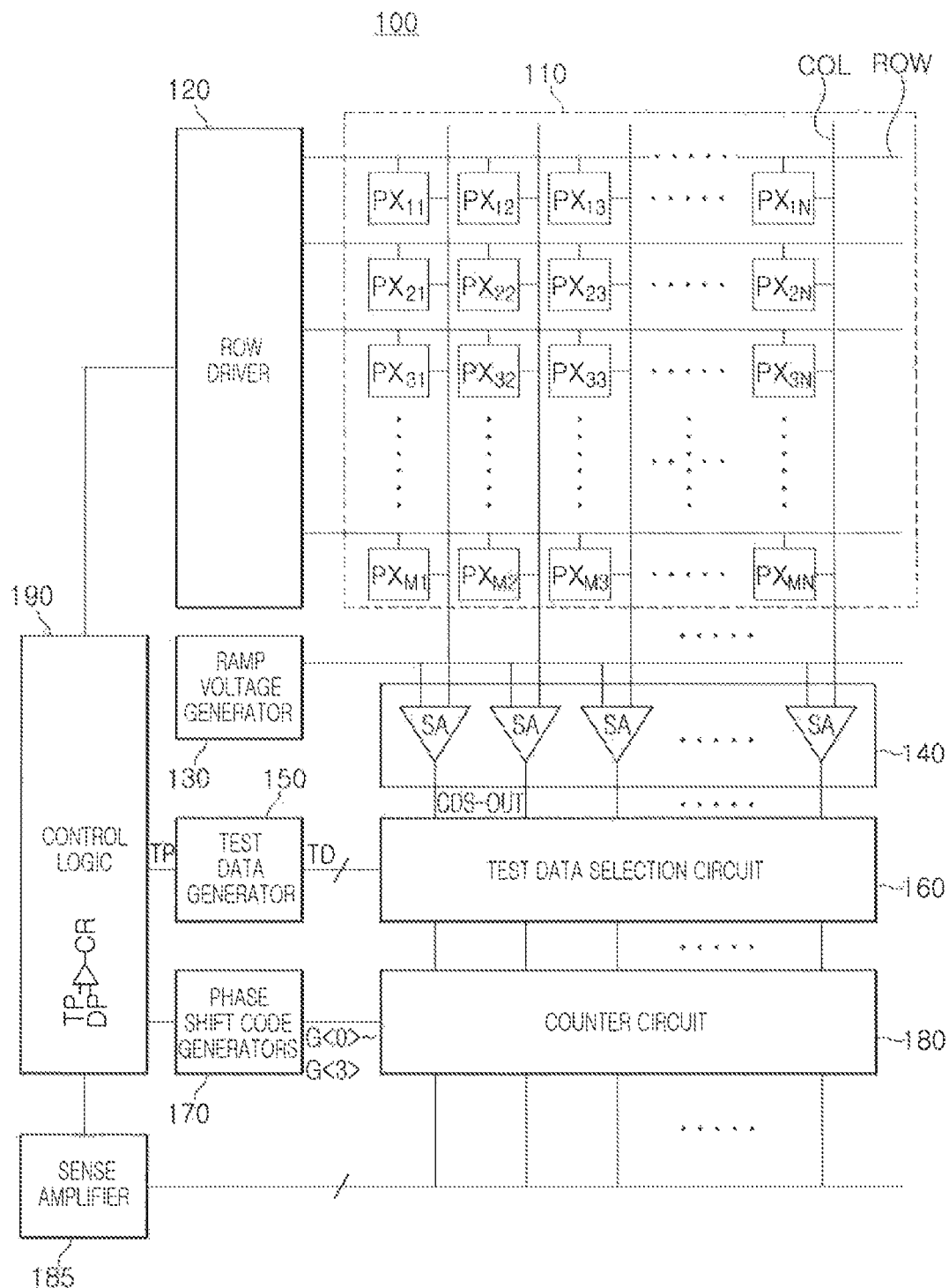
FIG. 5 is a block diagram illustrating an image sensor according to an exemplary embodiment of the present inventive concept.

FIG. 5 is a block diagram illustrating an image sensor according to an exemplary embodiment of the present inventive concept. Referring to FIG. 5, an image sensor 100 in the present embodiment may include a pixel array 110, and a controller for driving the pixel array 110. The controller may include a row driver 120, a ramp voltage generator 130, a sampling circuit 140, a test data generator 150, a test data selection circuit 160, a plurality of phase shift code generators 170, a counter circuit or counter (hereinafter referred to as counter circuit) 180, a sense amplifier 185, and a control logic 190.

The pixel array 110 may include a plurality of pixels PX11 to PXMN arranged at intersecting points of a plurality of row lines ROW and a plurality of column lines COL. In an exemplary embodiment of the present inventive concept, the plurality of pixels PX11 to PXMN may include the pixel circuit illustrated in FIG. 4. The row driver 120 may input a signal required to control the plurality of pixels PX11 to PXMN through the plurality of row lines ROW. As an example, a signal input to the plurality of pixels PX11 to PXMN through the plurality of row lines ROW may include a reset control signal RG, a transfer control signal TG, a selection control signal SEL, and the like. The row driver 120 may sequentially select the plurality of row lines ROW. The row driver 120 may select one of the plurality of row lines ROW during a certain horizontal period.

The sampling circuit 140 may obtain a reset voltage and a pixel voltage from some of the plurality of pixels PX11 to PXMN connected to a row line scanned by the row driver 120.

The sampling circuit 140 may include a plurality of comparators SA, and the plurality of comparators SA may he correlated double samplers. In an exemplary embodiment of the present inventive concept, each of the comparators SA may further include an auto-zero switch connected between a first input terminal and an output terminal and between a second input terminal and an output terminal.

Each of the comparators SA may receive a ramp voltage generated by the ramp voltage generator 130 through the first input terminal, and may receive a reset voltage and a pixel voltage from the pixels PX11 to PXMN through the second input terminal.

The test data generator 150 may receive a test pattern TP from the control logic 190, and may generate test data TD using the test pattern TP. The test data generator 150 may output the test data TD to the test data selection circuit 160.

The test data selection circuit 160 may output one of an output signal CDS_OUT of the sampling circuit 140 and the test data TD to the counter circuit 180 in response to a control signal output from the control logic 190. For example, the test data selection circuit 160 may output the output signal CDS_OUT of the sampling circuit 140 to the counter circuit 180 in a normal operation mode, and may output the test data TD to the counter circuit 180 in a test mode.

Each of the plurality of phase shift code generators 170 may generate phase shift codes G<0> to G<3> based on a clock signal output from the control logic 190. The phase shift codes G<0> to G<3> generated by the plurality of phase shift code generators 170 may be output to the counter circuit 180.

Figure 6:
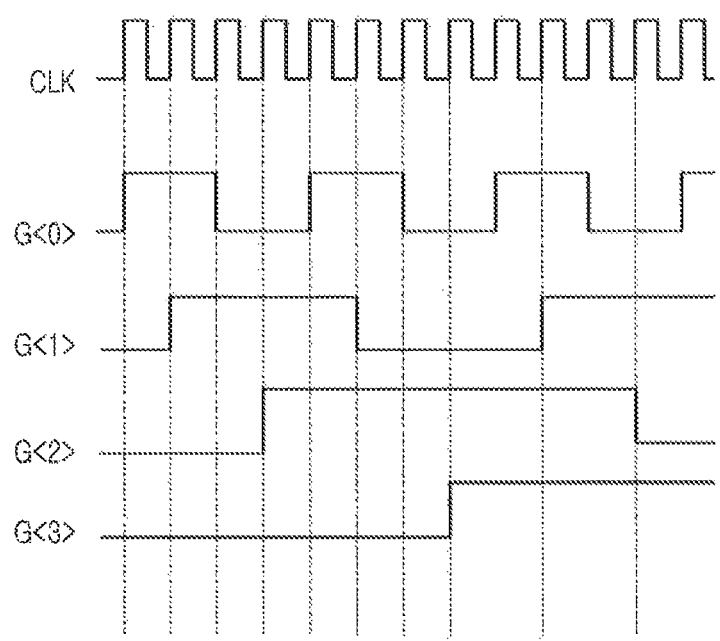
FIG. 6 is a diagram illustrating a phase shift code according to an exemplary embodiment of the present inventive concept.

FIG. 6 is a diagram illustrating a phase shift code according to an exemplary embodiment of the present inventive concept. Referring to FIG. 6, a phase shift code generator may generate a gray code based on a clock signal CLK output from a control logic. A gray code may be a code in which only the value of one bit changes in two consecutive bits.

As illustrated in FIG. 6, gray signals for generating a 4-bit gray code may have different periods from each other. For example, to generate a 4-bit gray code, when a period of a gray signal <G3> for generating a most significant bit (MSB) is PA, a period of a gray signal <G0> for generating a least significant bit (LSB) of a 4-bit gray code may be PA/4. Accordingly, a frequency of the gray signal <G0> may be four times a frequency of a gray signal <G4>. The gray signal <G3> may have the same frequency as a frequency of the gray signal <G4>, and a phase difference between the gray signal <G3> and the gray signal <G4> may be 90°. The gray signal <G2> may be twice the frequency of the gray signal <G4>.

The diagram of FIG. 6 illustrates an example in which the phase shift code generator generates a 4-bit gray code, but the present inventive concept is not limited thereto. The phase shift code generator may also generate a gray code having bits greater or less than 4 bits.

Referring back to FIG. 5, the counter circuit 180 may include a plurality of counters. The plurality of counters may be analog-to-digital converters.

The image sensor 100 may perform a test operation on one of the plurality of phase shift code generators 170 in a test mode. The counter circuit 180 may receive the phase shift codes G<0> to G<3> from at least one of the plurality of phase shift code generators 170, and may receive test data TD from the test data selection circuit 160. The counter circuit 180 may latch a digital code corresponding to a test pattern TP using the phase shift codes G<0> to G<3>, and may output the digital code.

The sense amplifier 185 may receive the digital code from the counter circuit 180, and may amplify the digital code. The sense amplifier 185 may output the amplified digital code to the control logic 190.

The control logic 190 may calculate a data pattern DP using the digital code. The control logic 190 may compare a stored data pattern DP with a test pattern TP, and may select one of the plurality of phase shift code generators 170 in accordance with a result of the comparison. The operation of comparison between the data pattern DP and the test pattern TP may be performed in a comparator arranged externally of the control logic 190, and the control logic 190 may receive a result of the comparison from the comparator.

The control logic 190 may store selection information for selecting one of the plurality of phase shift code generators 170 in a memory. The memory may be arranged in a chip or arranged externally of a chip, and the selection information stored in the memory may be used in a normal operation mode.

The test pattern TP may be a pattern for testing whether a first phase shift code generator operates normally with a minimum supply voltage margin. When the data pattern DP and the test pattern TP match, the control logic 190 may determine that first the phase shift code generator used to generate the data pattern DP operates normally with a minimum supply voltage margin.

In exemplary embodiments of the present inventive concept, when the data pattern DP and the test pattern TP do not match, the control logic 190 may determine that the first phase shift code generator used to generate the data pattern DP does not operate normally with a minimum supply voltage margin. The control logic 190 may perform the test operation as above using a second phase shift code generator, different from the first phase shift code generator.

When it is determined that all of the plurality of phase shift code generators 170 do not operate normally with a minimum supply voltage margin, the image sensor 100 may not be sold to an end user and may be discarded.

The counter circuit 180 may receive the phase shift codes G<0> to G<3> from one of the plurality of phase shift code generators 170 and may receive the output signal CDS_OUT from the sampling circuit 140 in a normal operation mode. The phase shift code generator outputting the phase shift codes G<0> to G<3> to the counter circuit 180 may be the phase shift code generator selected in the test mode. The phase shift code generator selected in the test mode may be a phase shift code generator operating normally with a minimum supply voltage margin.

The counter circuit 180 may latch a digital code corresponding to the output signal CDS_OUT using the phase shift codes G<0> to G<3>, and may output the digital code. The digital code may be reset data or pixel data.

The sense amplifier 185 may receive the digital code from the counter circuit 180, and may amplify the digital code. The sense amplifier 185 may output the amplified digital code to the control logic 190.

The control logic 190 may generate image data using the digital code. For example, the control logic 190 may generate image data using a difference between reset data and pixel data.

The image sensor 100 may test the plurality of phase shift code generators 170 in a test mode, and may select a phase shift code generator that operates normally with a minimum supply voltage margin as a result of the test operation. Since the image sensor 100 may use the normally functioning phase shift code generator in a normal operation mode, a process yield may improve.

Figure 7:
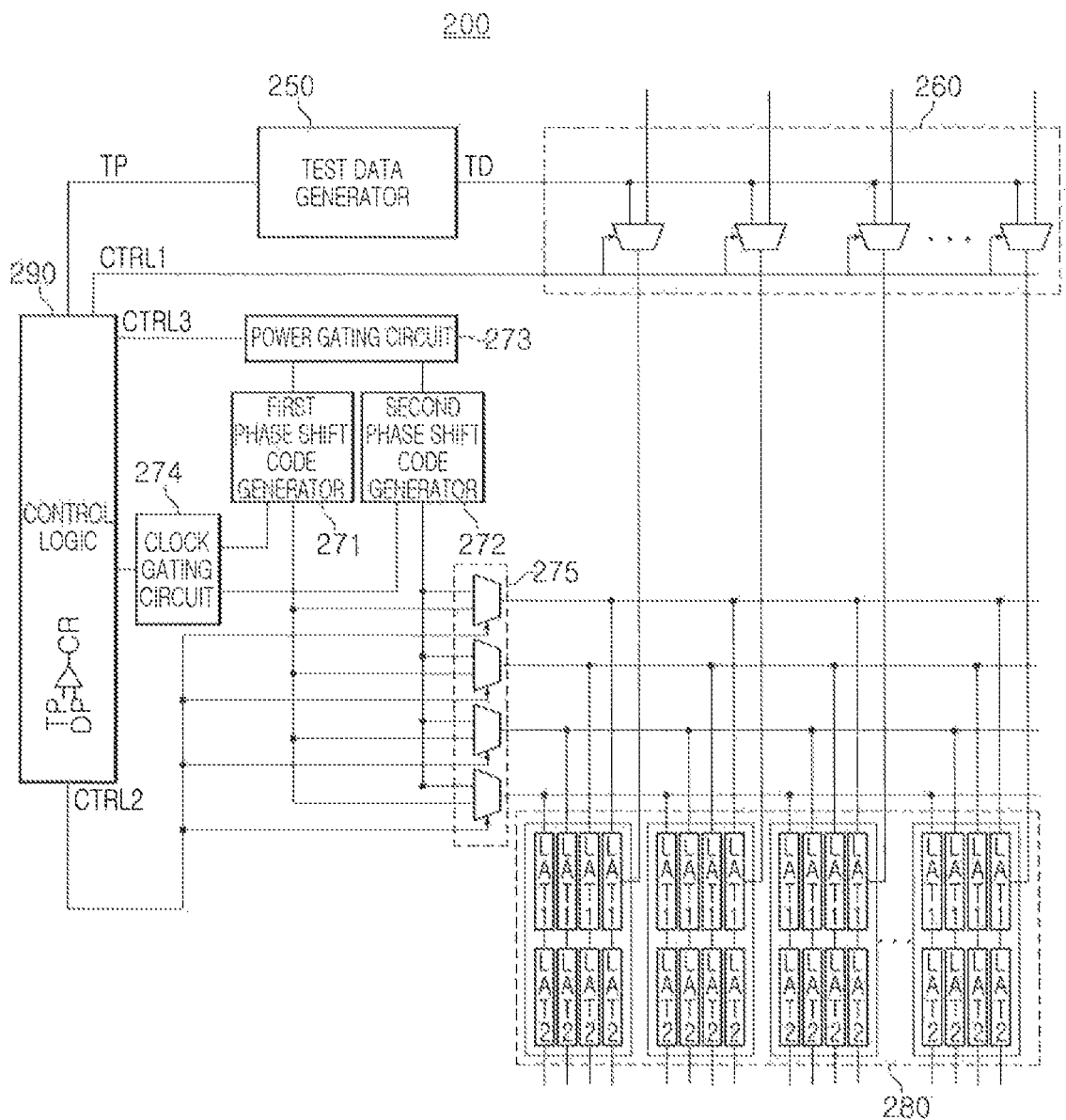
FIG. 7 is a block diagram illustrating an image sensor according to an exemplary embodiment of the present inventive concept.
Figure 8:
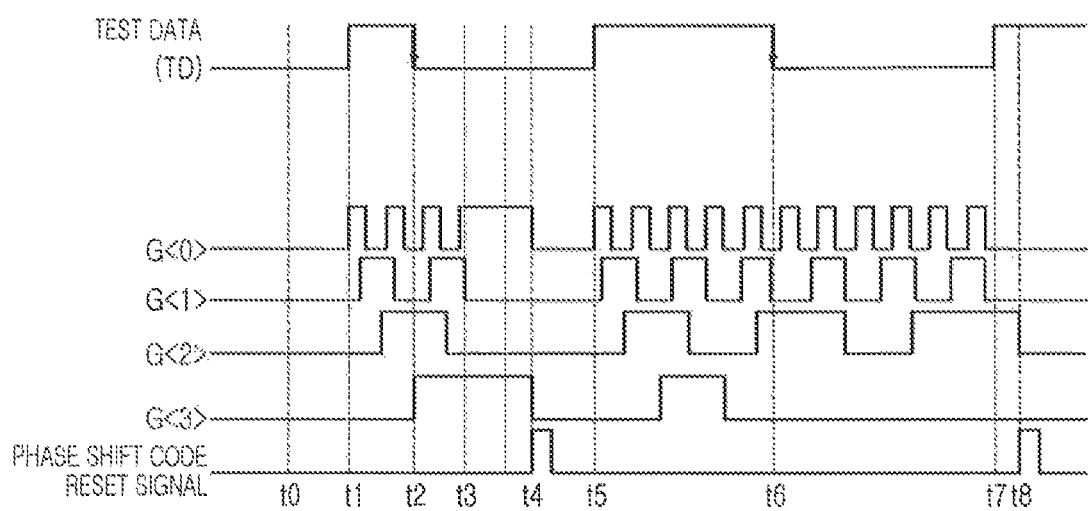
FIG. 8 is a timing diagram. illustrating a test operation of an image sensor according to an exemplary embodiment unite present inventive concept.

FIG. 7 is a block diagram illustrating an image sensor according to an exemplary embodiment of the present inventive concept. FIG. 8 is a timing diagram illustrating a test operation of an image sensor according to an exemplary embodiment of the present inventive concept.

Referring to FIGS. 7 and 8, an image sensor 200 in the present embodiment may include a test data generator 250, a test data selection circuit 260, a first phase shift code generator 271, a second phase shift code generator 272, a power gating circuit 273, a clock gating circuit 274, a phase shift code selection circuit 275, a counter circuit 280, a control logic 290, and the like.

The test data selection circuit 260 may include a plurality of selectors, and each of the plurality of selectors may include a first terminal for receiving test data TD from the test data generator 250, and a second terminal for receiving an output signal CDS_OUT of the sampling circuit (e.g., sampling circuit 140 of FIG. 5). Each of the plurality of selectors may be a multiplexer. Each of the plurality of selectors may select and output one of the test data TD and the output signal CDS_OUT of the sampling circuit to the counter circuit 280 in response to a first control signal CTRL1 output from the control logic 290. For example, when the image sensor 200 is in a test mode, each of the plurality of selectors may output the test data TD to the counter circuit 280 in response to the first control signal CTRL1. In exemplary embodiments of the present inventive concept, when the image sensor 200 is in a normal operation mode, each of the plurality of selectors may output the output signal CDS_OUT of the sampling circuit to the counter circuit 280 in response to the first control signal CTRL1.

The first phase shift code generator 271 and the second phase shift code generator 272 may generate a phase shift code based on a clock signal output from the control logic 290. The first phase shift code generator 271 and the second phase shift code generator 272 may be the same type of device having the same structure and size. In the alternative, the first phase shift code generator 271 and the second phase shift code generator 272 may be different device types having different structures and sizes.

The phase shift code selection circuit 275 may include a plurality of selectors, and each of the plurality of selectors may include a first terminal for receiving a first phase shift code from the first phase shift code generator 271, and a second terminal for receiving a second phase shift code from the second phase shift code generator 272. Each of the plurality of selectors may select and output one of the first phase shift code and the second phase shift code to the counter circuit 280 in response to a second control signal CTRL2 output from the control logic 290.

For example, when the image sensor 200 tests the first phase shift code generator 271, each of the plurality of selectors may output the first phase shift code to the counter circuit 280 in response to the second control signal CTRL2. In exemplary embodiments of the present inventive concept, when the image sensor 200 tests the second phase shift code generator 272, each of the plurality of selectors may output the second phase shift code to the counter circuit 280 in response to the second control signal CTRL2. In exemplary embodiments of the present inventive concept, when the image sensor 200 is in a normal operation mode, each of the plurality of selectors may output a phase shift code of a phase shift code generator selected in the test mode to the counter circuit 280 in response to the second control signal CTRL2.

The counter circuit 280 may include a plurality of counters, and each of the plurality of counters may include first latches LAT1 and second latches LAT2. For example, when each of the plurality of counters are 4-bit counters, each of the plurality of counters may include four first latches LAT1 and four second latches LAT2. However, the image sensor 200 illustrated in FIG. 7 is merely exemplary, and the number of bits of the counters included in the counter circuit 280 is not limited to 4 bits.

Referring to FIG. 8, in a test operation for the first phase shift code generator 271, the counter circuit 280 may receive test data TD front the test data selection circuit 260 and may receive the first phase shift code from the phase shift code selection circuit 275 at a time point t1. In FIG. 8, phase shift codes are represented by G<0> to G<3>, for example.

The counter circuit 280 may capture a phase shift code at a time point t2 at which the test data TD descends, and may store the captured phase shift code in the first latch LAT1. The phase shift code stored in the first latch LAT1 may be stored in the second latch LAT2.

At a time point t3, the phase shift code may be maintained, and the first phase shift code may be reset in response to a phase shift code reset signal at a time point t4. The counter circuit 280 may receive the test data TD from the test data selection circuit 260 at a time point t5, and may receive the first phase shift code from the phase shift code selection circuit 275.

The counter circuit 280 may capture a phase shift code at a time point t6 at which the test data TD descends, and may store the captured phase shift code in the first latch LAT1. The phase code captured at the time point t6 can be stored in the first latch LAT1 because the phase code captured at the time point t2 was transferred to the second latch LAT2. At a time point t7, the phase shift code may be maintained, and the first phase shift code may be reset in response to a phase shift code reset signal at a time point t8.

The control logic 290 may receive a first digital code stored in the first latch LAT1 and a second digital code stored in the second latch LAT2. The control logic 290 may calculate a first data pattern DP using the first digital code and the second digital code. For example, the first data pattern DP may be a value obtained by subtracting the first digital code from the second digital code.

The control logic 290 may compare a stored test pattern TP with the first data pattern DP, and when a result CR of the comparison indicates that the test pattern TP and the first data pattern DP match, the control logic 290 may determine that the first phase shift code generator 271 operates normally with a minimum supply voltage margin.

In a normal operation mode, the control logic 290 may store first selection information for selecting and using the first phase shift code generator 271 in a memory provided in a chip or provided externally of a chip. For example, the control logic 290 may generate a first control signal CTRL1 a second control signal CTRL2, and a third control signal CTRL3 for selecting and using the first phase shift code generator 271 based on the result CR of the comparison, and may store the first control signal CTRL1, the second control signal CTRL2, and the third control signal CIRL3 in the memory.

In exemplary embodiments of the present inventive concept, when the test pattern TP and the first data pattern DP do not match, the image sensor 200 may perform a test operation for the second phase shift code generator 272.

In the test operation for the second phase shift code generator 272, the counter circuit 280 may receive test data TD from the test data selection circuit 260 and may receive a second phase shift code from the phase shift code selection circuit 275 at the time point t1.

The counter circuit 280 may capture a phase shift code at a time point t2 at which the test data TD descends, and may store the captured phase shift code in the first latch LAT1. The phase shift code value stored in the first latch LAT1 may be stored in the second latch LAT2.

At a time point t3, the phase shift code may be maintained, and the second phase shift code may he reset in response to a phase shift code reset signal at a time point t4. The counter circuit 280 may receive test data TD from the test data selection circuit 260 and may receive the second phase shift code from the phase shift code selection circuit 275 at a time point t5.

The counter circuit 280 may capture the second phase shift code at a time point t6 at which the test data TD descends, and may store the captured second phase shift code in the first latch LAT1. The phase code captured at the time point t6 can be stored in the first latch LAT1 because the phase code captured at the time point t2 was transferred to the second latch LAT2. At a time point t7, the phase shift code may be maintained, and the second phase shift code may be reset in response to a phase shift code reset signal at a time point t8.

The control logic 290 may receive a first digital code stored in the first latch LAT1 and a second digital code stored in the second latch LAT2. The control logic 290 may calculate a second data pattern DP using the first digital code and the second digital code. For example, the second data pattern DP may be a value obtained by subtracting the first digital code from the second digital code.

The control logic 290 may compare a stored test pattern TP with the second data pattern DP, and when a result CR of the comparison indicates that the test pattern TP and the second data pattern DP match, the control logic 290 may determine that the second phase shift code generator 272 operates normally with a minimum supply voltage margin.

In a normal operation mode, the control logic 290 may store second selection information for selecting and using the second phase shift code generator 272 in a memory provided in a chip or provided externally of a chip. For example, the control logic 290 may generate a first control signal CTRL1, a second control signal CTRL2, and a third control signal CTRL3 for selecting and using the second phase shift code generator 272 based on the result CR of the comparison, and may store the first control signal CTRL1, the second control signal CTRL2, and the third control signal CTRL3 in the memory.

In a normal operation mode, the phase shift code selection circuit 275 may output the first phase shift code or the second phase shift code to the counter circuit 280 in response to the second control signal CTRL2. For example, when the selection information is the first selection information, the phase shift code selection circuit 275 may output the first phase shift code to the counter circuit 280. When the selection information is the second selection information, the phase shift code selection circuit 275 may output the second phase shift code to the counter circuit 280.

The counter circuit 280 may receive an output signal CDS_OUT of the sampling circuit from the test data selection circuit 260, and may receive a phase shift code from the phase shift code selection circuit 275 in accordance with the selection information.

In exemplary embodiments of the present inventive concept, the power gating circuit 273 may control power supplied to each of the first phase shift code generator 271 and the second phase shift code generator 272 in response to the third control signal CTRL3. For example, when the selection information is first selection information, the power gating circuit 273 may provide power to the first phase shift code generator 271, and may not supply power to the second phase shift code generator 272. When the selection information is second selection information, the power gating circuit 273 may supply power to the second phase shift code generator 272, and may not supply power to the first phase shift code generator 271.

In exemplary embodiments of the present inventive concept, the control logic 290 nays control the clock gating circuit 274 to supply a clock to one of the first phase shift code generator 271 and the second phase shift code generator 272 based on the selection information stored the memory. For example, when the selection information is the first selection information, the control logic 290 may control the clock gating circuit 274 to supply a clock to the first phase shift code generator 271. When the selection information is the second selection information, the control logic 290 may control the clock gating circuit 274 to supply a clock to the second phase shift code generator 272.

Figure 9:
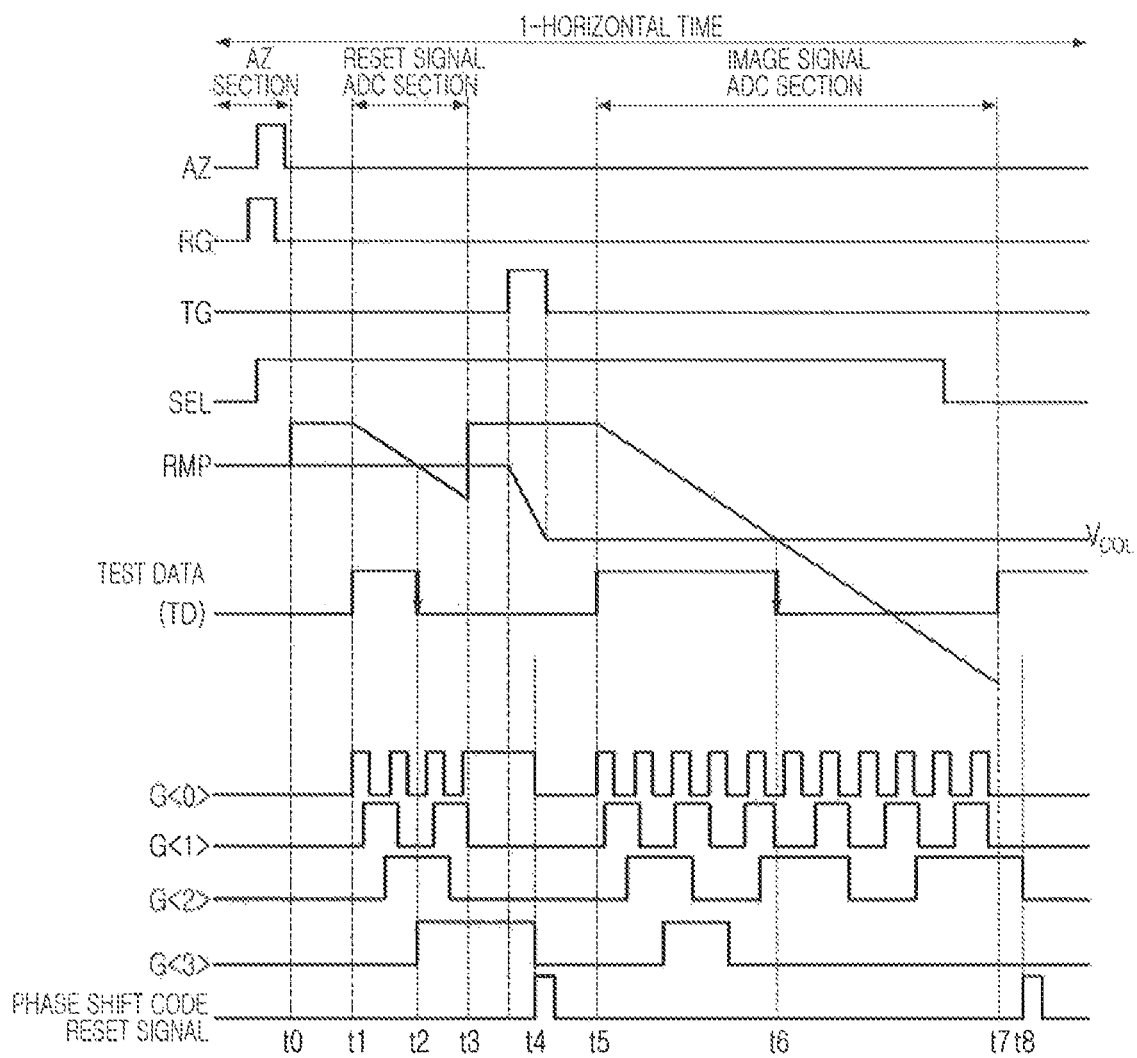
FIG. 9 is a timing diagram illustrating an operation of an image sensor according to an exemplary embodiment of the present inventive concept.

FIG. 9 is a timing diagram illustrating an operation of an image sensor according to an exemplary embodiment of the present inventive concept. Referring to FIG. 9 along with FIG. 7, a pixel signal output from a pixel in a normal operation mode may include a reset signal and an image signal. A 1-horizontal time may include an auto zero section (AZ section), a reset signal ADC section, and an image signal ADC section. The 1-horizontal time may be the time required for analog-to-digital conversion of pixel signals corresponding to a single row line or pixel signals output from pixels corresponding to a single row line.

In the auto zero section, levels of a ramp signal RMP and a pixel signal $V_{COL}$ may be the same in response to an auto-zero signal AZ. The reset signal ADC section may be a time section in which a reset signal is converted into a digital signal based on the ramp signal RMP. The image signal ADC section may be a time section in which an image signal is convened into a digital signal based on the ramp signal RMP.

A reset transistor may be turned on by a reset control signal RG, and a voltage of a floating diffusion included in a pixel may be reset. A phase shift code may he input to a counter at a time point t1 at which the ramp signal RMP descends. In the following, the ramp signal RMP may be referred to as a ramp voltage RMP and the pixel signal $V_{COL}$ may be referred to as a reset voltage $V_{COL}$. When a select transistor is turned on by a selection control signal SEL, a comparator may compare a ramp voltage RMP with a reset voltage $V_{COL}$, output through a column line, and may output a signal transited at a time point t2 at which a level of the ramp voltage RMP is lower than a level of the reset voltage $V_{COL}$ to the counter. The counter may count a time from t1 to t2 in which the ramp voltage RMP is higher than the reset voltage $V_{COL}$ using a phase shift code. A phase shift code (or reset data) corresponding to the reset voltage $V_{COL}$ may be stored in a first latch LAT1 using the time from t1 to t2. The phase shift code stored in the first latch LAT1 may be stored in a second latch LAT2 thereafter.

As a time point t3, the ramp voltage RMP may increase again, and the phase shift code value may be maintained. A transfer transistor may be turned on by a transfer control signal TG, and an electric charge generated by a photodiode of a pixel may move to the floating diffusion. Accordingly, the voltage $V_{COL}$ output through the column line COL may decrease. In the following, the pixel signal $V_{COL}$ may be referred to as a pixel voltage $V_{COL}$. At a time point t4, the phase shift code may be reset by a phase shift code reset signal. The phase shift code may be input to a counter at the time point ti at which the ramp signal RMP descends.

After the transfer transistor TX is turned off, the comparator may compare the ramp voltage RMP with a pixel voltage $V_{COL}$ output through a column line, and may output a signal transited at a time point t6 at which a level of the ramp voltage RMP is tower than a level of a pixel voltage $V_{COL}$ to the counter. The counter may count a time from t5 to t6 in which the ramp voltage RMP is higher than the pixel voltage $V_{COL}$ using a phase shift code. A phase shift code (or pixel data) corresponding to the pixel voltage $V_{COL}$ may he stored in the first latch LAT1 using the time from t5 to t6.

The control logic 290 may receive the reset data and the pixel data stored in the first latch LAT1 and the second latch LAT2, and may generate image data using a difference between the reset data and the pixel data.

FIG. 9 illustrates an example in which the ramp voltage RMP has a tendency to decrease over time, but the present inventive concept is not limited thereto. The ramp voltage RMP may also have a tendency to increase over time. When the ramp voltage RMP has a tendency to increase over time, the counter circuit 280 may count a time in which the voltage $V_{COL}$ output through the column line is higher than the ramp voltage RMP and may generate reset data and pixel data.

In the test mode, the test data generator 250 may receive a test pattern TP from the control logic 290 between a time point t0 and a time point t1. For example, the test data generator 250 may receive a test pattern TP from the control logic 290 from a time point at which 1-horizontal time starts to a time point before the reset signal ADC section starts.

The test data generator 250 may generate test data based on the test pattern TSP. The test data generator 250 may output test data TD to the counter circuit 280 at the time point t1.

The counter circuit 280 may receive the test data TD from the test data generator 250 and may receive a phase shift code from a phase shift code generator at the time point t1. The counter circuit 280 may capture the phase shift code at the time point t2 at which the test data TD descends, and may store the captured phase shift code in the first latch LAT1. The phase shift code value stored in the first latch LAT1 may then be stored in the second latch LAT2.

At a time point t3, the phase shift code value may be maintained, and the phase shift code may be reset by a phase shift code reset signal at a time point t4. The test data generator 250 may receive a test pattern TP from the control logic 290 between the time point t3 and a time point t5. For example, the test data generator 250 may receive a test pattern TP from the control logic 290 from a time point at which a reset signal ADC section ends to a time point before an image signal ADC section starts.

The test data generator 250 may generate test data based on the test pattern TP. The test data generator 250 may output the test data TD to the counter circuit 280 at the time point t5.

The counter circuit 280 may receive the test data TD from the test data generator 250, and may receive a phase shift code from the phase shift code generator at the time point t5. The counter circuit 280 may receive the phase shift code from the first phase shift code generator 271 or the second phase shift code generator 272. The counter circuit 280 may capture the phase shift code at a time point to at which the test data TD descends, and may store the captured phase shift code in the first latch LAT1.

At a time point t7, the phase shift code may be maintained, and the phase shift code may be reset by a phase shift code reset signal at a time point t8. The control logic 290 may receive the phase shift code value stored in the first latch LAT1 and the phase shift code value stored in the second latch LAT2. The control logic 290 may calculate the data pattern DP using the phase shift code value stored in the first latch LAT1 and the phase shift code value stored in the second latch LAT2.

The control logic 290 may compare a stored test pattern TP with the data pattern DP, and may determine whether the phase shift code generator operates normally with a minimum supply voltage margin in accordance with a result CR of the comparison.

Figure 10:
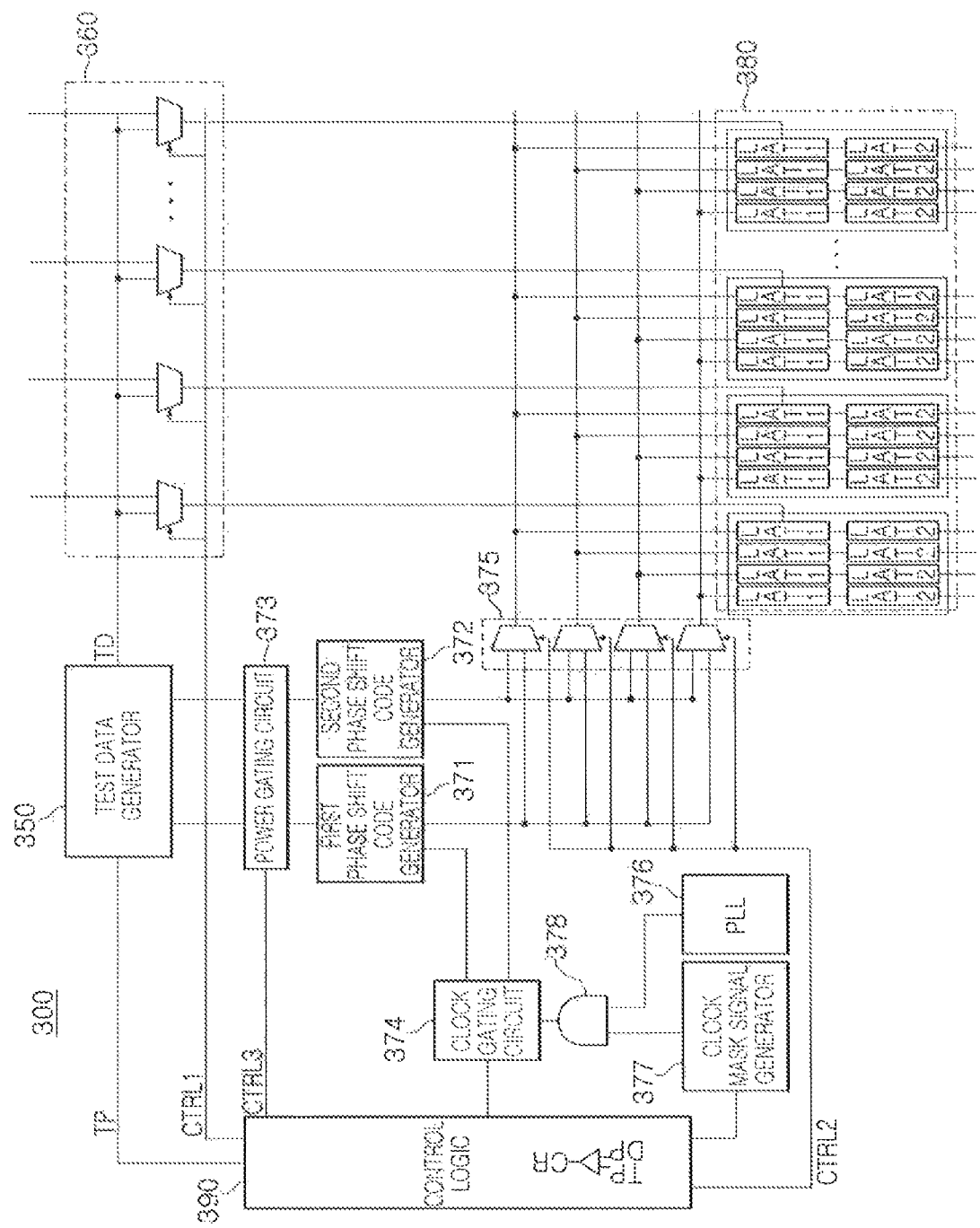
FIG. 10 is a block diagram illustrating an image sensor according to an exemplary embodiment of the present inventive concept.

FIG. 10 is a block diagram illustrating an image sensor according to an exemplary embodiment of the present inventive concept. Referring to FIG. 10, an image sensor 300 may include a test data generator 350, a test data selection circuit 360, a first phase shift code generator 371, a second phase shift code generator 372, a power gating circuit 373, a clock gating circuit 374, a phase shift code selection circuit 375, a counter circuit 380, a control logic 390, and the like.

Different front the image sensor 200 illustrated in FIG. 7, the image sensor 300 illustrated in FIG. 10 may further include a clock mask signal generator 377, a clock signal generator 376, and a logic gate 378. The clock mask signal generator 377 may output a clock mask signal having a size corresponding to a test pattern, and the clock signal generator 376 may output a clock signal. The logic gate 378 may receive the clock mask signal from the clock mask signal generator 377, and may receive the clock signal from the clock signal generator 376.

The logic gate 378 may logically combine the clock mask signal and the clock signal and may output the combined signal to the clock gating circuit 374. For example, the logic gate 378 may be an AND gate, and the logic gate 378 may perform a calculation of conjunction for the clock mask signal and the clock signal. The logic gate 378 may output a clock signal to which a mask having a size corresponding to the test pattern is applied to the clock gating circuit 374.

Each of the first phase shift code generator 371 and the second phase shift code generator 372 may output a phase shift code based on the clock signal to which a mask having a size corresponding to the test pattern is applied.

Figure 11:
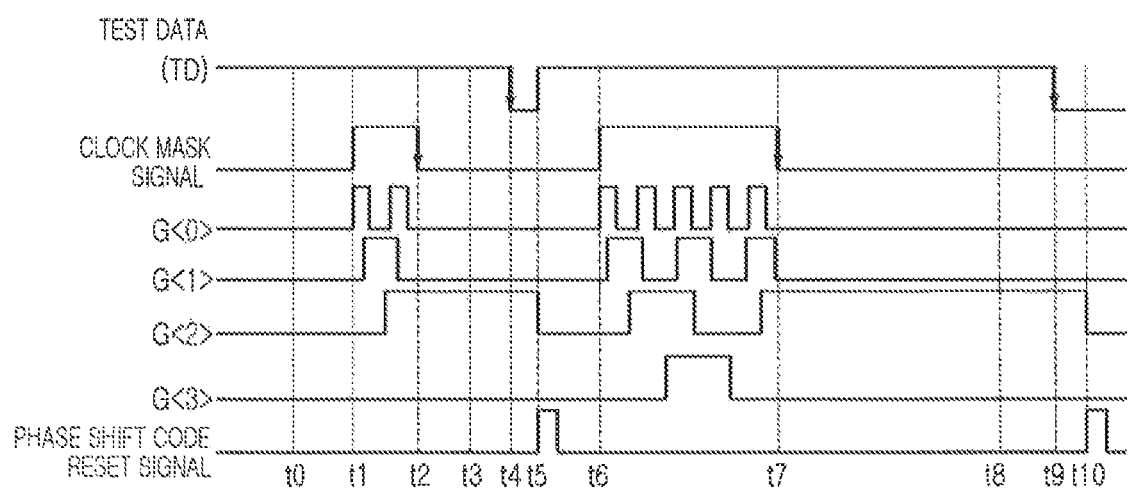
FIG. 11 is a timing diagram illustrating a test operation of an image sensor according to an exemplary embodiment of the present inventive concept.

FIG. 11 is a timing diagram illustrating a test operation of an image sensor according to an exemplary embodiment of the present inventive concept. Referring to FIG. 11 along with FIG. 10, the clock gating circuit 374 may supply a clock signal to which a mask having a size (from t1 to t2) corresponding to a test pattern is applied, to the first phase shift code generator 371 and the second phase shift code generator 372.

In a test operation for the first phase shift code generator 371, the first phase shift code generator 371 may output a phase shift code to the counter circuit 380 based on a clock signal to which a mask is applied at a time point t1. The phase shift code output from the first phase shift code generator 371 may maintain a value obtained at a time point t2.

The test data generator 350 may generate test data TD based on a test pattern. The test data generator 350 may output the test data TD to the counter circuit 380.

The counter circuit 380 may receive the test data TD from the test data generator 350, and may store a phase shift code at a time point t4 at which the test data TD descends in a first latch LAT1. The phase shift code stored in the first latch LAT1 may then be stored in a second latch LAT2. The phase shift code may be reset by a phase shift code reset signal at a time point t5.

The clock gating circuit 374 may provide a clock signal to which a mask having a size (from t6 to t7) corresponding to a test pattern is applied, to the first phase shift code generator 371 and the second phase shift code generator 372.

The first phase shift code generator 371 may output a phase shift code to the counter circuit 380 based on the clock signal to which a mask is applied at a time point t6. The phase shift code output from the first phase shift code generator 371 may maintain a value obtained at a time point t7.

The test data generator 350 may receive a test pattern TP from the control logic 390. The test data generator 350 may generate test data TD based on a test pattern TP. The test data generator 350 may output the test data TD to the counter circuit 380.

The counter circuit 380 may receive the test data TD from the test data generator 350, and may store a phase shift code in the first latch LAT1 at a time point t9 at which the test data TD descends. The phase shift code may be reset by a phase shift code reset signal at a time point t10.

The control logic 390 may receive a first digital code stored in the first latch LAT1 and a second digital code stored in the second latch LAT2. The control logic 390 may calculate a first data pattern DP using the first digital code and the second digital code. For example, the first data pattern DP may be a value obtained by subtracting the first digital code from the second digital code.

The control logic 390 may compare a stored test pattern TP with the first data pattern DP, and when a result CR of the comparison indicates that the test pattern TP and the first data pattern DP match, the control logic 390 may determine that the first phase shift code generator 371 operates normally with a minimum supply voltage margin.

The control logic 390 may store first selection information for selecting and using the first phase shift code generator 371 in a memory provided in a chip or provided externally of a chip in a normal operation mode.

In exemplary embodiments of the present inventive concept, when the test pattern TP and the first data pattern DP do not match, the image sensor may perform a test operation with respect to the second phase shift code generator 372.

In the test operation for the second phase shift code generator 372, the clock gating circuit 374 may supply a clock signal to which a mask having a size (from t1 to t2) corresponding to a test pattern is applied, to the first phase shift code generator 371 and the second phase shift code generator 372.

The second phase shift code generator 372 may output a phase shift code to the counter circuit 380 based on the clock signal to which a mask is applied at a time point t1. The phase shift code output from the second phase shift code generator 372 may maintain a value obtained at a time point t7.

The test data generator 350 may generate test data TD based on a test pattern TP. The test data generator 350 may output the test data TD to the counter circuit 380.

The counter circuit 380 may receive the test data TD from the test data generator 350, and may store the phase shift code in the first latch LAT1 at a time point t4 at which the test data TD descends. The phase shift code value stored in the first latch LAT1 may then be stored in the second latch LAT2. The phase shift code may be reset by a phase shift code reset signal at a time point t5.

The clock gating circuit 374 may supply a clock signal to which a mask having a size (from t6 to t7) corresponding. to a test pattern is applied, to the first phase shift code generator 371 and the second phase shift code generator 372.

The second phase shift code generator 372 may output the phase shift code to the counter circuit 380 based on the clock signal to which a mask is applied at a time point t6. The phase shift code output from the second phase shift code generator 372 may maintain a value obtained at a time point t7.

The test data generator 350 may receive a test pattern from the control logic 390. The test data generator 350 may generate test data TD based on the test pattern TP. The test data generator 350 may output the test data TD to the counter circuit 380.

The counter circuit 380 may receive the test data TD from the test data generator 350, and may store a phase shift code in the first latch LAT1 at a time point t9 at which the test data TD descends. The phase shift code may be reset by a phase shift code reset signal at a time point t10.

The control logic 390 may receive a first digital code stored in the first latch LAT1 and a second digital code stored in the second latch LAT2. The control logic 390 may calculate a second data pattern DP using the first digital code and the second digital code. For example, the second data pattern DP may be a value obtained by subtracting the first digital code from the second digital code.

The control logic 390 may compare a stored test pattern TP with the second data pattern DP, and when a result CR of the comparison indicates that the test pattern TP and the second data pattern DP match, the control logic 390 may determine that the second phase shift code generator 372 operates normally with a minimum supply voltage margin. The control logic 390 may store second selection information for selecting and using the second phase shift code generator 372 in a memory provided in a chip or provided externally of a chip in a normal operation mode.

Figure 12:
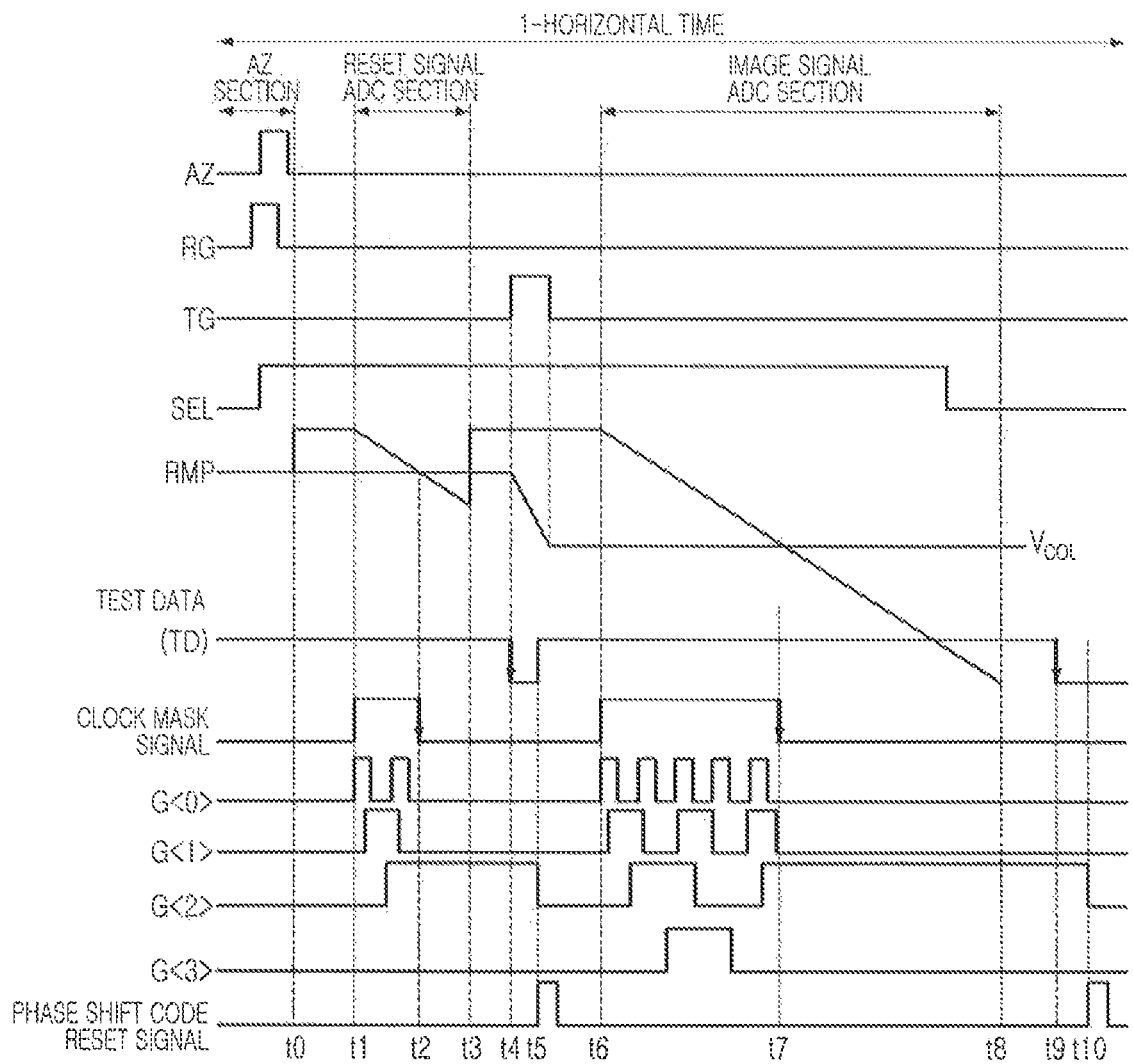
FIG. 12 is a timing diagram illustrating an operation of an image sensor according to an exemplary embodiment of the present inventive concept.

FIG. 12 is a timing diagram illustrating an operation of an image sensor according to an exemplary embodiment of the present inventive concept. Different from the timing diagram illustrated in FIG. 9, in the timing diagram illustrated in FIG. 12, in a test mode, a time point at which the test data generator 350 outputs test data TD to the counter circuit 380 may be delayed.

In a test mode, the test data generator 350 may receive a test pattern TP from the control logic 390 between the time point t3 and the time point t4, may generate test data TD based on the test pattern TP, and may output the test data TD to the counter circuit 380. For example, the test data generator 350 may output the test data TD to the counter circuit 380 after a time point at which a reset signal ADC section terminates.

The test data generator 350 may receive the test pattern TP from the control logic 390 between the time point t8 and the time point t9, may generate test data TD based on the test pattern TP, and may output the test data TD to the counter circuit 380. For example, the test data generator 350 may output the test data TD to the counter circuit 380 after a time point at which an image signal ADC section terminates.

By delaying the time point at which the test data generator 350 outputs the test data TD to the counter circuit 380 to a time point after the image signal ADC section terminates, the test data TD may be prevented from descending, before the time point t2 at which the phase shift code is maintained. In addition, by delaying the time point at which the test data generator 350 outputs the test data TD to the counter circuit 380 to a tune point after the image signal ADC section terminates, the test data TD may be prevented from descending before the time point t7 at which the phase shift code is maintained.

Figure 13:
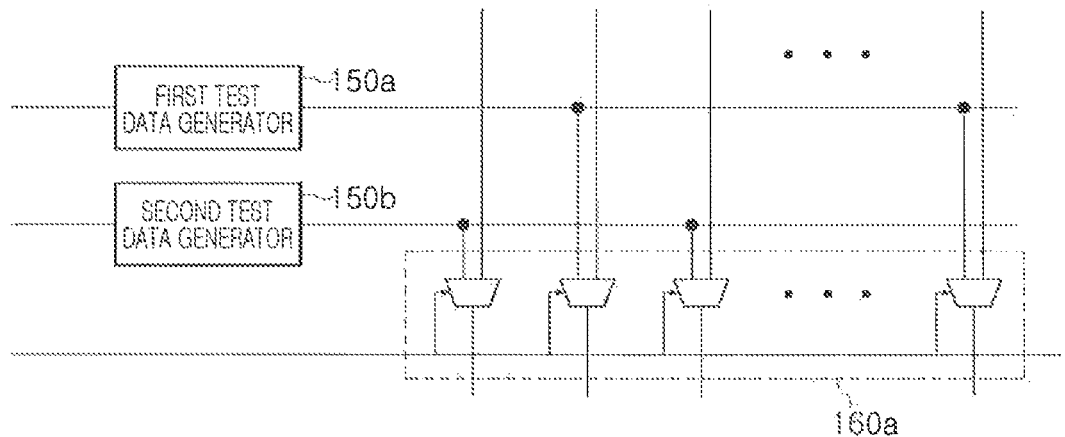
FIG. 13 is a block diagram illustrating a portion of an image sensor according to an exemplary embodiment of the present inventive concept.

FIG. 13 is a block diagram illustrating a portion of an image sensor according to an exemplary embodiment of the present inventive concept. Referring to FIG. 13, a test data generator may include a first test data generator 150a and a second test data generator 150b.

The first test data generator 150a may generate first test data in accordance with a data pattern, and the second test data generator 150b may generate second test data in accordance with a data pattern. The first test data and the second test data may be different from each other.

The first test data generator 150a may output the first test data to a selector corresponding to an odd-numbered column line of a test data selection circuit 160a, and the second test data generator 150b may output the second test data to a selector corresponding to an even-numbered column line of the test data selection circuit 160a.

Accordingly, different pieces of test data may be output to the odd-numbered column line and the even-numbered column line.

Figure 14:
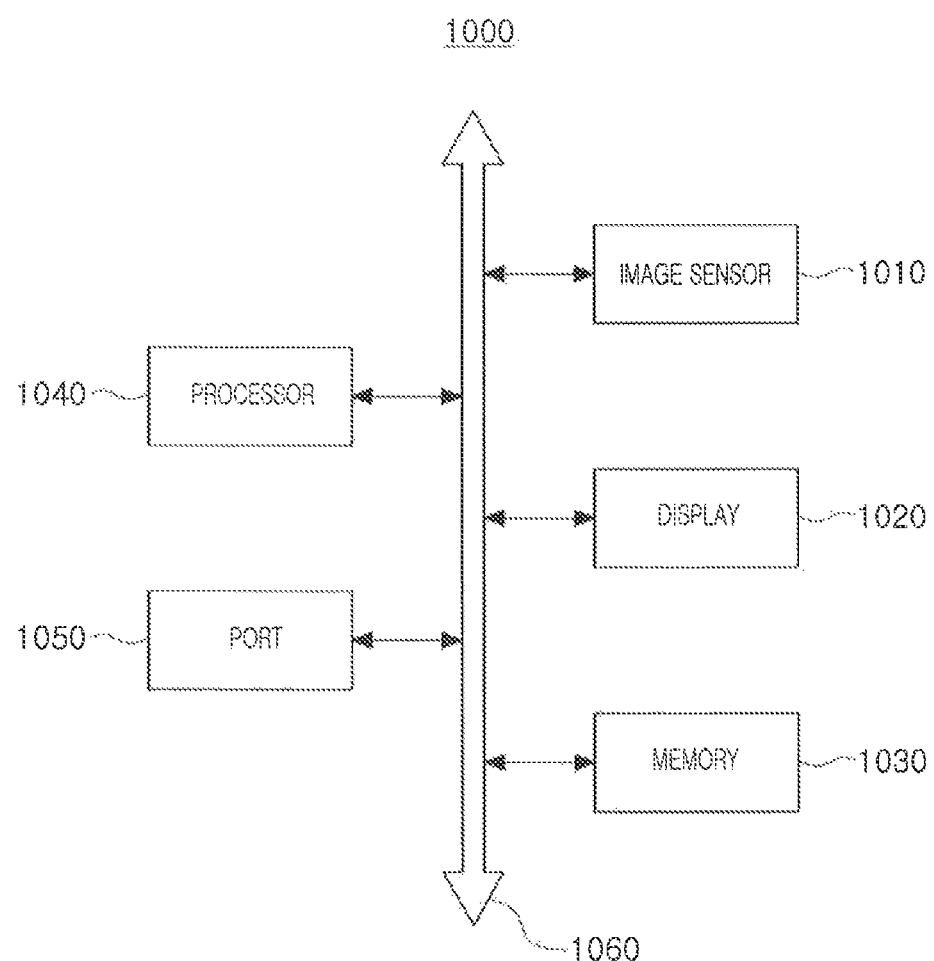
FIG. 14 is a block diagram illustrating an electronic device including an image sensor according to an exemplary embodiment of the present inventive concept.

FIG. 14 is a block diagram illustrating an electronic device including an image sensor according to an exemplary embodiment of the present inventive concept.

An electronic device 1000 illustrated, in FIG. 14 may include an image sensor 1010, a display 1020, a memory 1030, a processor 1040, a port 1050, and the like. The electronic device 1000 may further include a wired and wireless communication device, a power device, and the like. Among the elements illustrated in FIG. 14, the port 1050 may be a device included with the electronic device 1000 to communicate with a video caret, a sound card, a memory card, a universal serial bus (USB) device, and the like. The electronic device 1000 may include a desktop computer or a laptop computer, and may also include a smart phone, a table personal computer (PC), a smart wearable device, and the like.

The processor 1040 may perform a certain calculation and may process a command word, a task, and the like. The processor 1040 may be a central processor unit (CPU), a microprocessor unit (MCU), a system-on-chip (SoC), or the like, and may communicate with the image sensor 1010, the display 1020, and the memory device 1030 through a bus 1060, and may also communicate with other devices connected to the port 1050.

The memory 1030 may be a storage medium for storing data used for operation of the electronic device 1000, multimedia data, and the like. The memory 1030 may include a volatile memory such as a random access memory (RAM), or a non-volatile memory such as a flash memory. The memory 1030 may also include a solid state drive (SSD), a hard disk drive (HDD), or an optical disk drive (ODD) as a storage device. An input and output device may also be included in the electronic device 1000 or he connected with the electronic device 1000 and may include an input device such as a keyboard, a mouse, a touch screen, and the like, and an output device such as a display, an audio output unit, and the like, provided to a user.

The image sensor 1010 may be mounted on a package substrate and may be connected to the processor 1040 by the bus 1060 or by another communication means. The image sensor 1010 may be employed in the electronic device 1000 as in the exemplary embodiments described with reference to FIGS. 1 to 13.

According to the exemplary embodiments of the present inventive concept, by performing a repair operation to replace a defective phase shift code generator with a spare phase shift code generator, an additional operation margin of a phase shift code generator may be secured. Accordingly, a manufacturing yield may improve.

While the present inventive concept has been shown and described with reference to exemplary embodiments thereof, it will be apparent to those skilled in the art that modifications and variations could be made thereto without departing from the scope of the present inventive concept as set forth by the appended claims.

What is Claimed is:

1. An image sensor, comprising:
a pixel array including a plurality of pixels connected to a plurality of row lines and a plurality of column lines;
a sampling circuit including a plurality of comparators, each of the plurality of comparators including a first input terminal connected to one of the plurality of column lines and a second input terminal connected to a ramp voltage generator;
a plurality of phase shift code generators, each of the plurality of phase shift code generators configured to output a phase shift code;
a power gating circuit configured to supply a power o each of the plurality of phase shift code generators; and
a counter configured to receive the phase shift code from one of the plurality of phase shift code generators which receives the power supplied by the power gating circuit, latch a digital code corresponding to the phase shift code, and output the digital code.

2. The image sensor of claim 1, wherein the power gating circuit cuts off the power to remaining phase shift code generators, different from the one of the plurality of phase shift code generators.

3. The image sensor of claim 1, wherein the counter comprises a first latch and a second latch, and
in a test mode, the first latch latches a first digital code corresponding to the phase shift code at a first time point, and the second latch latches a second digital code corresponding to the phase shift code at a second time point after the first time point.

4. The image sensor of claim 3, further comprising:
a control logic configured to obtain a data pattern by calculating a difference of the first digital code and the second digital code, and compares the data pattern with a test pattern output to the counter before the first time point in the test mode.

5. The image sensor of claim 4, wherein the control logic selects the one of the plurality of phase shift code generators in a normal operation mode, when the test pattern and the data pattern match each other.

6. The image sensor of claim 4, wherein, when the test pattern and the data pattern do not match each other, the power gating circuit supplies the power to another one of the plurality of phase shift code generators different from the one of the plurality of phase shift code generators, in response to a control of the control logic, and
the counter receives the phase shift code from the other one of the plurality of phase shift code generators, and latches the digital code corresponding to the phase shift code from the other one of the plurality of phase shift code generators.

7. The image sensor of claim 4, wherein the control logic stores selection information for controlling the power gating circuit in a normal operation mode, based on a comparison between the test pattern and the data pattern.

8. The image sensor of claim 1, further comprising:
a clock gating circuit configured to supply a clock to each of the plurality of phase shift code generators.

9. The image sensor of claim 8, wherein, the clock gating circuit supplies the clock to the one of the plurality of phase shift code generators, and cuts off the clock to remaining phase shift code generators, different from the one of the plurality of phase shift code generators.

10. The image sensor of claim 9, wherein, while the clock gating circuit supplies the clock only to the one of the plurality of phase shift code generators, the power gating circuit supplies the power to each of the plurality of phase shift code generators.

11. An image sensor, comprising:
a pixel array including a plurality of pixels connected to a plurality of row lines and a plurality of column lines;
a sampling circuit including a plurality of comparators, each of the plurality of comparators including a first input terminal connected to one of the plurality of column lines and a second input terminal connected to a ramp voltage generator;
a plurality of phase shift code generators, each of the plurality of phase shift code generators configured to output a phase shift code;
a clock gating circuit configured to supply a clock to each of the plurality of phase shift code generators; and
a counter configured to receive the phase shift code from one of the plurality of phase shift code generators which receives the clock supplied by the clock gating circuit, latch a digital code corresponding to the phase shift code, and output the digital code.

12. The image sensor of claim 11, wherein the clock gating circuit cuts off the clock to remaining phase shift code generators, different from the one of the plurality of phase shift code generators.

13. The image sensor of claim 11, wherein the counter comprises a first latch and a second latch, and
in a test mode, the first latch latches a first digital code corresponding to the phase shift code at a first time point, and the second latch latches a second digital code corresponding to the phase shift code at a second time point after the first time point.

14. The image sensor of claim 13, further comprising:
a control logic configured to obtain a data pattern by calculating a difference of the first digital code and the second digital code, and compares the data pattern with a test pattern output to the counter before the first time point in the test mode.

15. The image sensor of claim 14, wherein the control logic selects the one of the plurality of phase shift code generators in a normal operation mode, when the test pattern and the data pattern match each other.

16. The image sensor of claim 14, wherein, when the test pattern and the data pattern do not match each other, the clock gating circuit supplies the clock to another one of the plurality of phase shift code generators different from the one of the plurality of phase shift code generators, in response to a control of the control logic, and
the counter receives the phase shift code from the other one of the plurality of phase shift code generators, and latches the digital code corresponding to the phase shift code from the other one of the plurality of phase shift code generators.

17. An operation. method of an image sensor, comprising:
resetting a plurality of phase shift code generators, each of the plurality of phase shift code generators configured to output a phase shift code;
inputting a clock to one of the plurality of phase shill code generators;
maintaining the phase shift code output by the one of the plurality of phase shift code generators, at a first time point;
latching, by a counter, a first digital code corresponding to the phase shift code maintained after the first time point, at a second time point in which test data is inputted to the counter including a plurality of latches;
resetting the plurality of phase shift code generators;
maintaining the phase shift code output by the one of the plurality of phase shift code generators, at a third time point;
latching, by the counter, a second digital code corresponding to the phase shift code maintained after the third time point, at a fourth time point in which the test data is inputted to the counter including a plurality of latches; and
determining whether the one of the plurality of phase shift code generators is selected or not, by comparing a test pattern corresponding to the test data with a data pattern corresponding to a difference between the first digital code and the second digital code.

18. The method of claim 17, wherein a time duration between the first time point and the second time point is different from a time duration between the third time point and the fourth time point.

19. The method of claim 17, wherein the counter includes a first latch and a second latch, and
the first digital code is stored in the first latch, and the second digital code is stored in the second latch.

20. The method of claim 17, wherein the first time point and the third time point are determined by a clock in which the one of the plurality of phase shift code generators receives from a clock gating circuit.

* * * * *